UNITED STATES PATENT OFFICE.

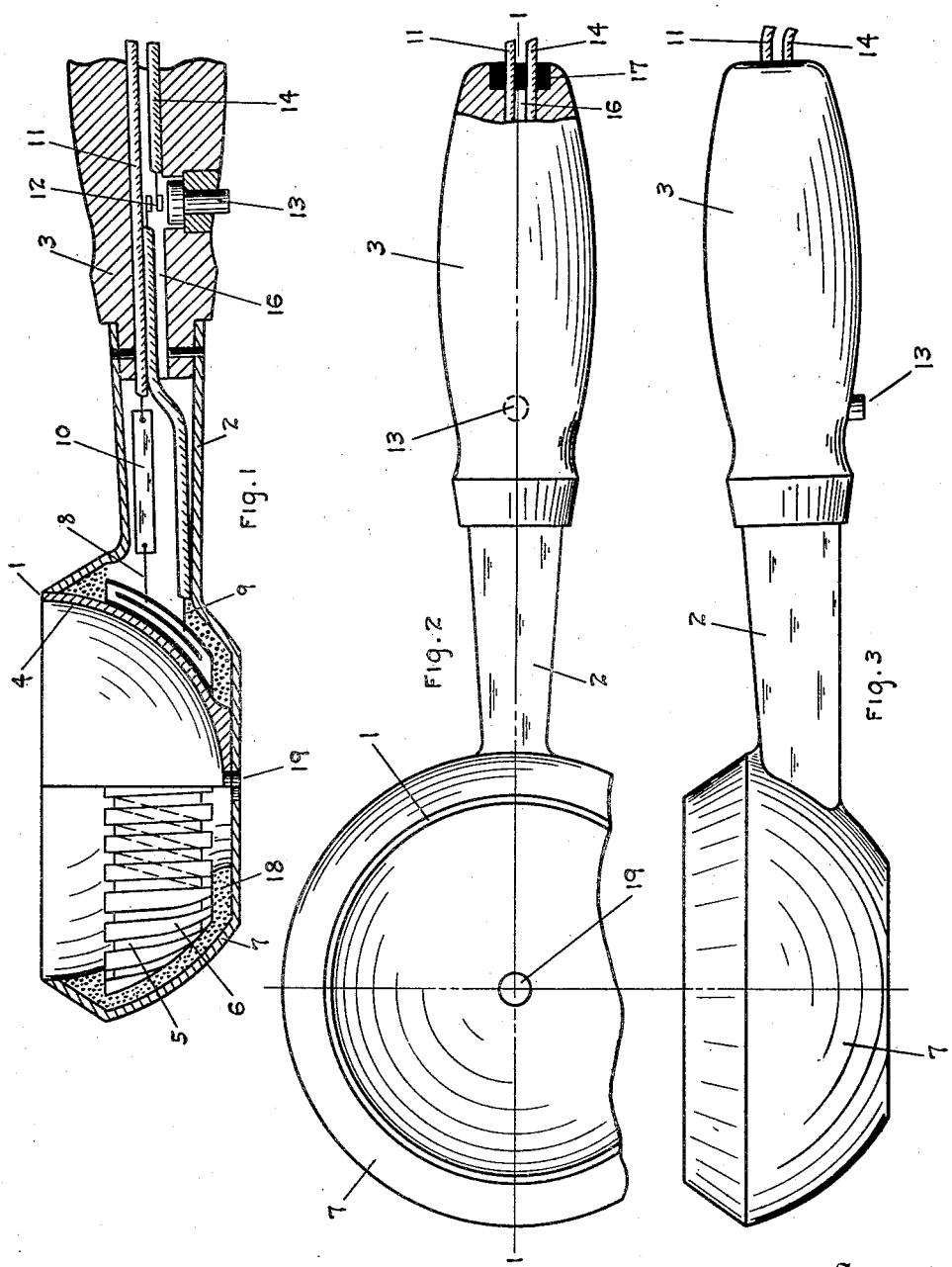

JOHN W. COX, OF ERIE, PENNSYLVANIA, ASSIGNOR OF ONE-FOURTH TO GEORGE R. METCALF AND ONE-FOURTH TO EDWARD E. WALKER, BOTH OF ERIE, PENNSYLVANIA.

ICE-CREAM DIPPER.

1,323,523.　　　　Specification of Letters Patent.　　Patented Dec. 2, 1919.

Application filed March 8, 1919. Serial No. 281,344.

*To all whom it may concern:*

Be it known that I, JOHN W. Cox, a citizen of the United States, residing at Erie, in the county of Erie and State of Pennsylvania, have invented new and useful Improvements in Ice-Cream Dippers, of which the following is a specification.

This invention relates to ice cream dippers and consists in certain improvements in the construction thereof as will be hereinafter fully described and pointed out in the claims.

In the dipping of ice cream difficulty is experienced in the adhesion of the cream to the dipper. The object of the present invention is to form a dipper in which this difficulty is obviated.

The invention is illustrated in the accompanying drawings as follows:—

Figure 1 shows a section on the line 1—1 the outer surface of the inner wall of the bowl being shown in elevation to better show construction.

Fig. 2 shows a plan view of the dipper.

Fig. 3 shows a side elevation.

1 marks the bowl, 2 the metal handle extending from the bowl and 3 a wooden extension on the metal handle. The bowl is made up of an inner wall 4.

An electric heating element is carried around the inner wall of the bowl, the element being ordinarily formed by a coil 5 on an insulating mica strip 6. The outer wall 7 forms a housing or closure for the heating element. The terminals of the heating element are connected with the conductors 8 and 9. The conductor 8 leads to a thermal switch 10. These switches are of common construction and break the connection at a certain temperature. A wire conductor 11 leading to a source of supply leads from the thermal switch 10. The conductor 9 leads to a switch 12. The switch 12 is controlled by a push button 13 in convenient position to be actuated by an operator grasping the handle. A conductor 14 extends from the switch 12 to a source of supply completing the circuit. The conductors 11 and 14 extend through the hollow portion of the metal handle 2 and through an opening 16 in the wooden extension so as to interfere as little as possible with a convenient manipulation of the dipper. The opening 16 is preferably sealed by a closure 17 around the conductors 11 and 14 and these conductors are preferably water-proofed.

I prefer to fill the space between the wall 7 and the heating element with a non-conducting or insulating substance 18 so that the heat from the element is delivered almost entirely to the inner wall 4.

In order to vent the dipper so that the cream will readily drop I provide a vent opening 19 which extends through the outer and inner wall of the dipper.

In operation the inner wall of the dipper is sufficiently warm to melt a thin layer of cream and the mass of cream frees itself instantly from the dipper when it is inverted. While the mass could be discharged from the dipper especially by a progressive tipping of the dipper the vent permits of the immediate inverting of the dipper and dropping of the mass as a whole from the bowl and in some uses of the dipper this is desirable. It will be noted that while this form of dipper readily attains the object of disengaging the mass of cream from the dipper it is possible to so arrange the dipper as to have no projections or parts that do not readily lend themselves to cleansing.

What I claim as new is:—

1. In an ice cream dipper, the combination of a bowl; and a heating element carried by and adapted to heat the bowl.

2. In an ice cream dipper, the combination of a double-walled bowl; and an electric heating element arranged between the walls of the bowl.

3. In an ice cream dipper, the combination of a bowl; a handle extending from the bowl; an electric heating element carried by and adapted to heat the bowl; and an electric conductor for the element led to the element through the handle.

4. In an ice cream dipper, the combination of a bowl; an electric heating element carried by and adapted to heat the bowl; a housing inclosing the element; and means for insulating the housing.

5. In an ice cream dipper, the combination of a double-walled bowl; an electric heating element arranged between the walls of the bowl; and means for insulating the element from the outer wall.

6. In an ice cream dipper, the combination of a bowl; a handle extending from the bowl; an electric heating element carried by and adapted to heat the bowl; and an electric switch controlling the element carried by the handle.

7. In an ice cream dipper, the combination of a bowl; a handle extending from the bowl; an electric heating element carried by and adapted to heat the bowl; and an electric switch controlling the element carried by the handle in position to be operated by the hand of an operator grasping the handle.

8. In an ice cream dipper, the combination of a bowl; an electric heating element carried by and adapted to heat the bowl; an electric conductor leading to the element; and a thermally actuated switch in the conductor, said switch being sensitive to the temperature of the bowl.

9. In an ice cream dipper, the combination of a bowl having a vent; and an electric heating element carried by and adapted to heat the bowl.

10. In an ice cream dipper, the combination of a bowl having a double wall with a vent extending through said walls; and an electric heating element arranged between the walls and adapted to heat the inner wall.

In testimony whereof I have hereunto set my hand.

JOHN W. COX.